UNITED STATES PATENT OFFICE.

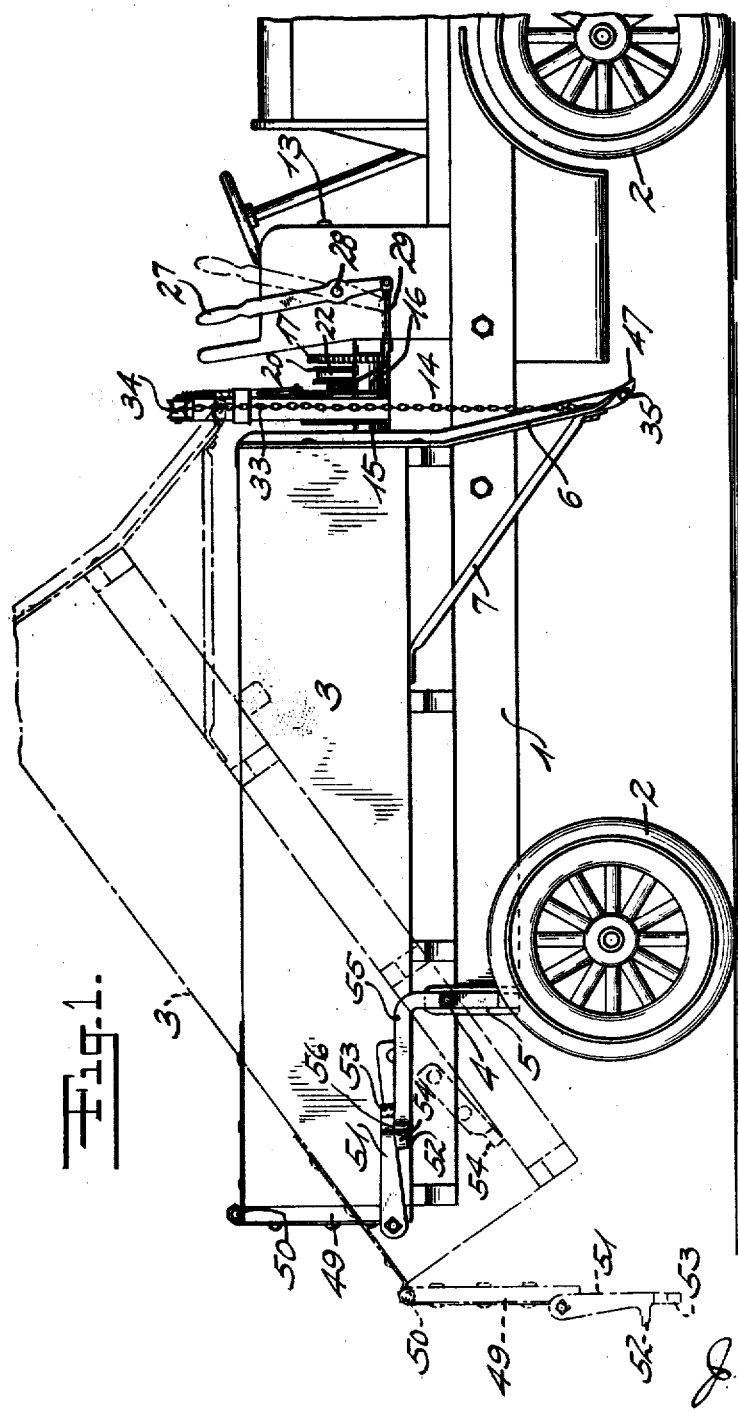

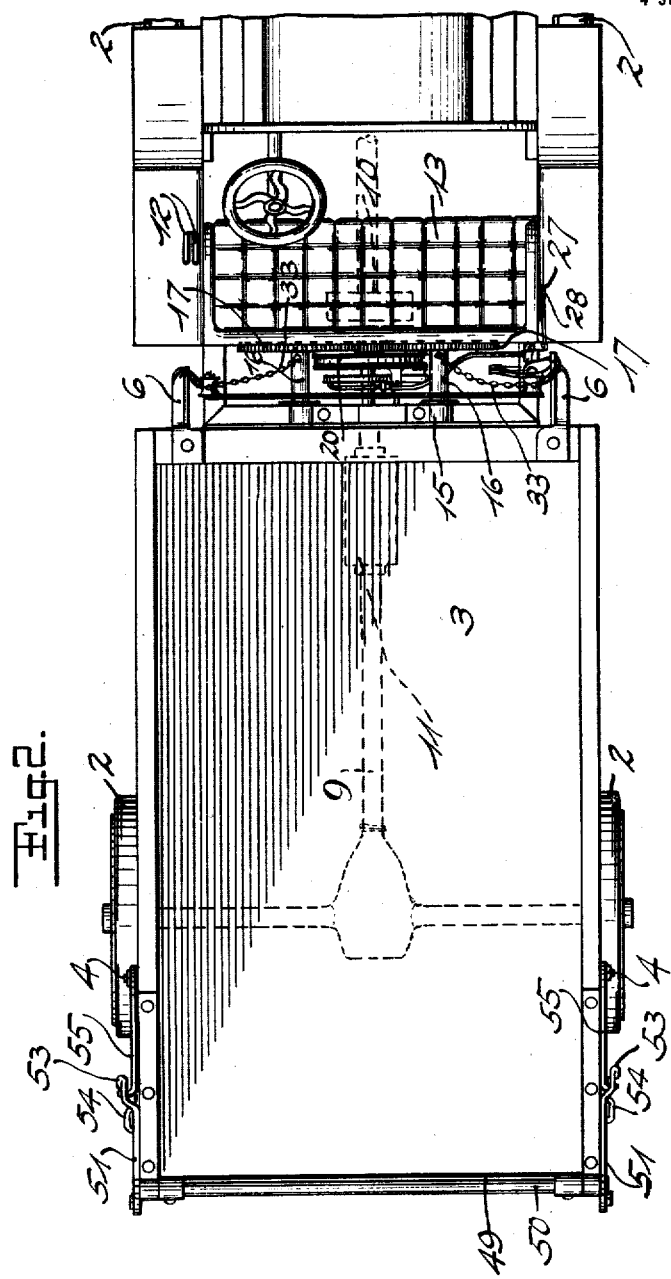

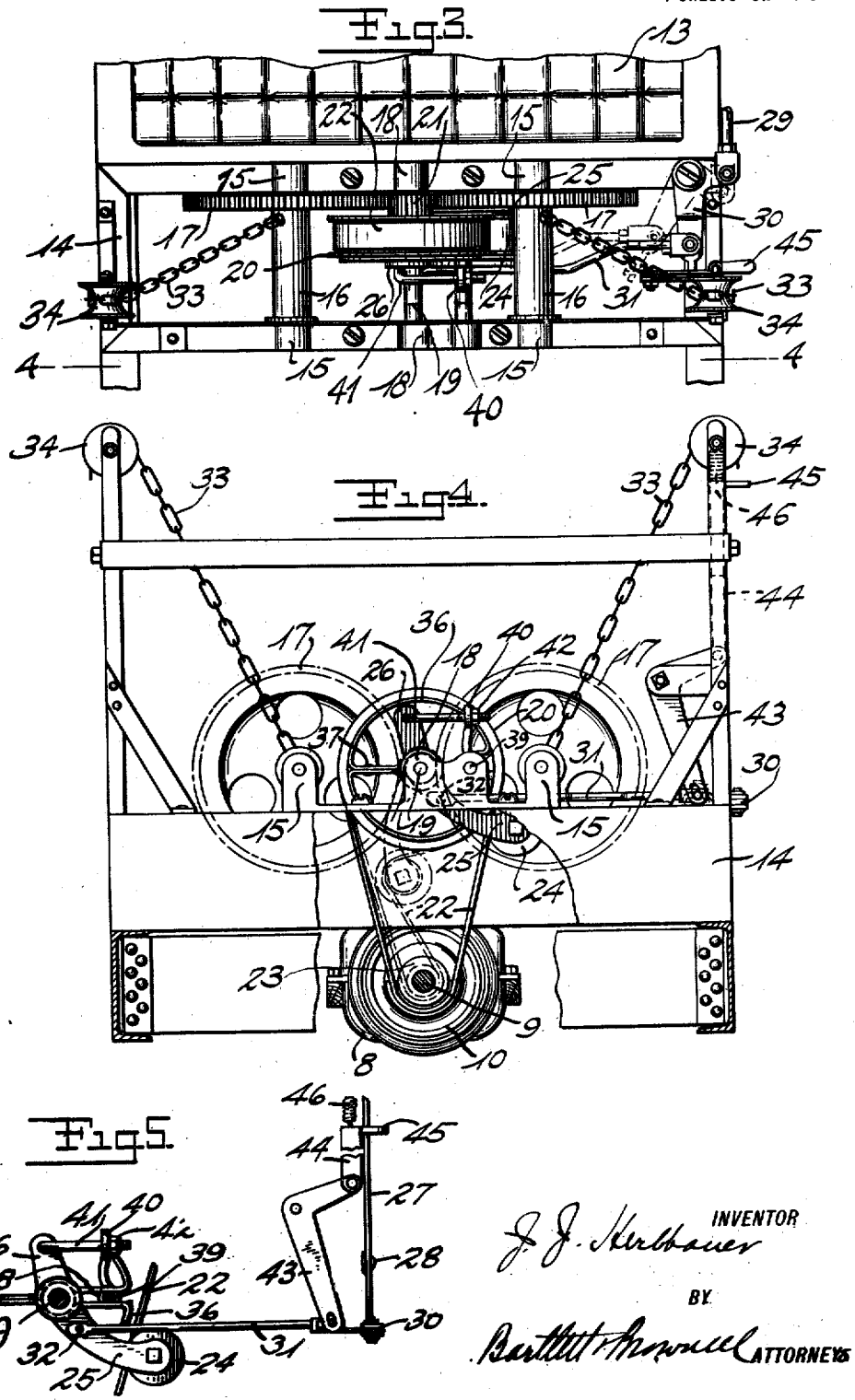

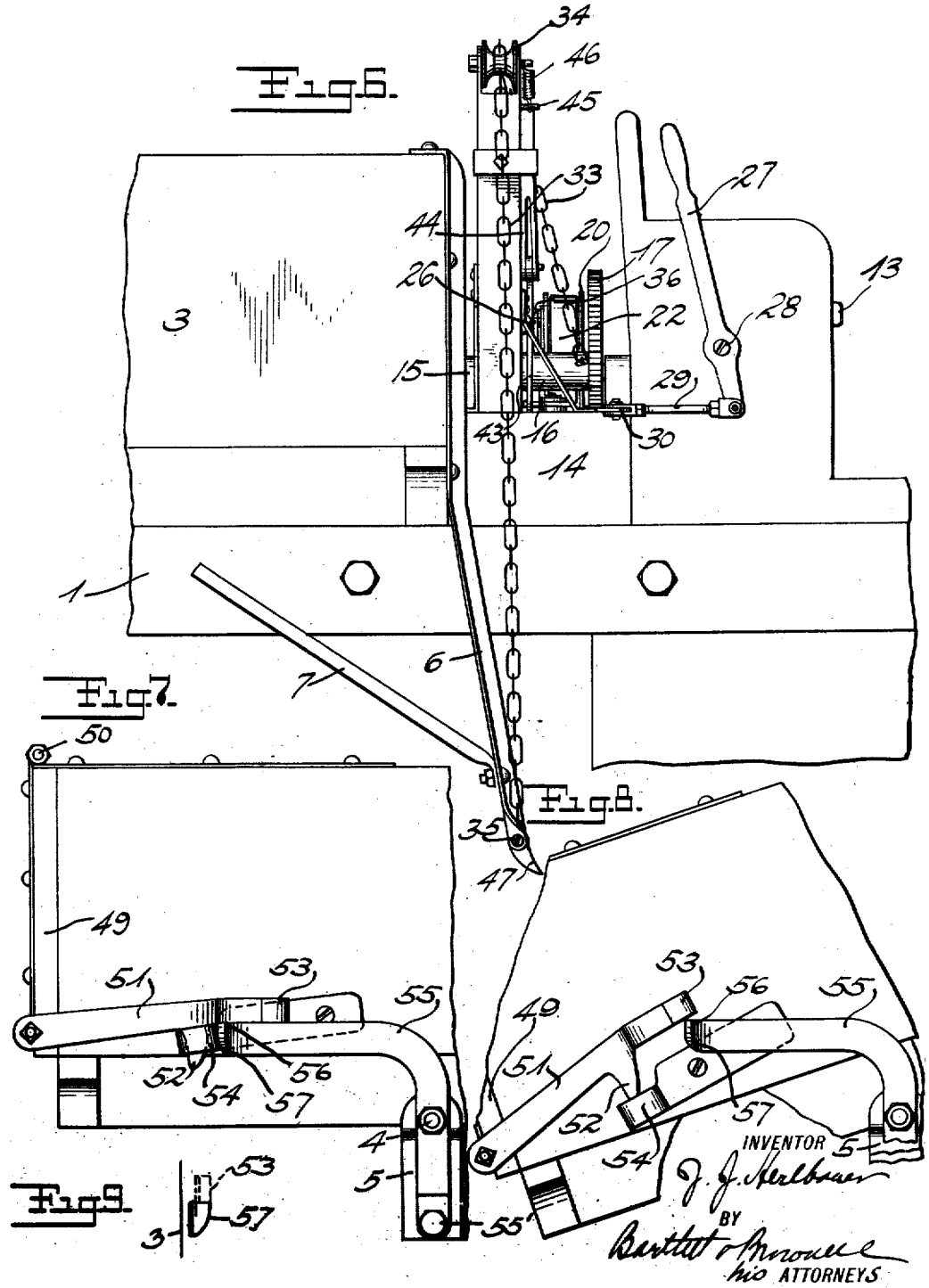

JOSEPH J. HERLBAUER, OF RICHMOND HILL, NEW YORK.

AUTOMATIC AUTOMOBILE DUMP-TRUCK.

1,263,243.   Specification of Letters Patent.   Patented Apr. 16, 1918.

Application filed June 23, 1917. Serial No. 176,490.

*To all whom it may concern:*

Be it known that I, JOSEPH J. HERLBAUER, a citizen of the United States, residing at 532 Cottage street, Richmond Hill, county of Queens, State of New York, have invented a certain new and useful Improvement in Automatic Automobile Dump-Trucks, of which the following is a full, clear, and exact description.

My invention relates to automatic automobile dump trucks, and has for its object to provide an automobile truck in which the driving motor of the truck is used to tilt the body of the truck as desired. It further has for its object to provide in such a truck means whereby the tilitng action can be stopped at any moment and the body held in its tilted position.

It further has for its object to provide in such a truck means for automatically disconnecting the motor from the tilting mechanism when the body has been moved to a predetermined point.

It further has for its object to provide such a truck with a brake which will automatically stop the movement of the body when the controlling lever is released.

The following is a description of an embodiment of my invention, reference being had to the accompanying drawings, in which:

Figure 1 is a side elevation of a truck embodying my invention and showing in dotted lines the body of the truck in tilted position;

Fig. 2 is a plan view of the same;

Fig. 3 is a plan view of the tilting mechanism and the removable frame forming part thereof;

Fig. 4 is a section on the line 4—4, Fig. 3;

Fig. 5 is a detail view showing portions of the belt tightener, brake and operating mechanism disassociated from the supporting frame;

Fig. 6 is a side elevation of the parts shown in Figs. 3 and 4, and portions of the truck body and driver's seat adjacent thereto;

Fig. 7 is a detail view of the tail-board of the box body and the means for securing it and automatically releasing it;

Fig. 8 is a similar view of the same with the parts in the positions in which they are when the box body is tilted so that the tail-board is about to be released;

Fig. 9 shows a detail of the releasing abutment.

Referring more particularly to the drawings, 1 and 2 are the frame and supporting wheels of the truck; 3 is a box body carried thereby, being pivoted at 4 to uprights 5 secured to the frame 1. This box body is provided at its forward end with downwardly depending goose-necks 6 reinforced by braces 7.

8 is the motor for driving the driving wheels of the truck, 9 being the main transmission shaft connecting the motor with the differential. 10 indicates the ordinary clutch and 11 indicates the casing containing the speed changing gears, the clutch being actuated by a foot lever in the ordinary way, and the gears being shifted by the ordinary gear shifting lever 12 having, as usual, positions for varying speeds and also a neutral position in which the motor runs free. Behind the driver's seat 13 is a sub-frame carried by the truck frame and consisting of a base portion 14 carrying on its front and rear ends bearings 15 for two shafts, each of which carries a cable drum 16 and a gear 17 and has its axis parallel to the longitudinal axis of the truck. The base portion 14 also carries bearings 18 in which is mounted a shaft 19 parallel to the drum shafts and the axis of the motor and carrying a flanged pulley 20 and a pinion 21 meshing with the gears 17. Upon this flanged pulley 20 is a loose belt 22 which, at its lower end, passes around a small flanged pulley 23 mounted on the transmission shaft 9. Ordinarily, on account of the looseness of the belt 22, the pulley 23 revolves without producing any action upon the box tilting mechanism. In order to operatively connect the pulley 23 with the pulley 20, when desired, I provide suitable means for tightening the belt 22. These means consist of a belt tightening pulley 24 mounted in the end of an arm 25 pivotally mounted upon the shaft 19. This element has an upwardly extending arm 26 to be used in actuating the brake to be hereinafter described. In order to actuate the arm 25 with its pulley 24, I provide a lever 27 pivoted at 28 to the right-hand side of the driver's seat. From this lever extends a connecting link 29 which is connected to one arm of a bell crank 30, the other arm being connected to a link 31 which is pivotally connected at 32 to the pulley tightening lever 25. The forward movement of the upward end of the lever 27 results in a downward movement of the lever 25 so that the pulley 24 acts upon the belt 22 to tighten the same, as shown in dotted lines in Fig. 4. This lever 27 is normally actuated only when the automobile is standing still and the gear shifting lever is in neutral position, at which time the pulley 23 will be running idly. When the lever 27 is moved forwardly the belt 22 is tightened and power is transmitted from the pulley 23 to the pulley 20, which thereupon drives the pinion 21, which in turn drives the gears 17, revolving the drums 16 so as to wind up the cables 33 connected thereto. These cables pass over pulleys 34 and have their free ends connected at 35 to the downwardly extending portions of the goose-necks 6. As the cables 33 wind upon the drums 16, the goose-necks 6 are raised and with them the front end of the box body, causing the same to tilt as shown in Fig. 1. When the lever 27 is moved to its rear position, the motor is disengaged from the tilting mechanism permitting the box body to move toward its original position by the action of gravity.

It is to be noted that the lifting mechanism, aside from the goose-necks 6 and the pulley 20, together with the sub-base 14, constitutes a self-contained device such that it can be separately assembled and applied as a whole to any suitable dumping truck, the shaft 19 being in position to be operatively connected to and disconnected from the motor shaft by means of a belt and belt tightener, and the drum 16 being adapted to be connected to the goose-necks by cables passing over uprights at the corners of the sub-frame.

In order to be able to hold the box body in elevated position or at any intermediate point, I provide a brake 36 which is also operated by the lever 27, being thrown into action when that lever is in its extreme rear position. This braking mechanism consists of a brake band surrounding a hub extension from the arm 25 and located within the flanged pulley 20 so as to be able to make braking engagement with an internal braking surface on that pulley. This brake consists of two semi-circular spring portions which are fastened together near one end at 37 and at their other ends are separated by a cam 38 movably mounted upon a stud 39 carried by the frame 14. From the cam 38 projects a lever arm 40 and to this lever arm the upwardly projecting arm 26 is connected by a lost motion link 41, the length of which is adjustable by reason of the nut 42. When the lever 27 is moved rearwardly so as to loosen the belt 22, and after that belt has been loosened, the arm 26 acts to bring the nut 42 into engagement with the arm 40 so as to tilt the cam 38 causing the two portions of the strap 36 to separate so as to engage the inner braking surface of the pulley 20 and thus apply the brake so as to hold the tilted box in any position in which it may be desired.

In order to automatically release the power from the braking mechanism, in case the operator does not release the lever 27 at the proper time, I provide a bell crank 43, one end of which is connected to one end of the bell crank 30. To the other end of this bell crank 43 is connected a slide 44 having a projection 45 and to the upper end of this slide is connected a spring 46, which normally tends to move the slide 44 upward. This spring acting through the slide 44, bell crank 43, bell crank 30 and link 29 acts upon the lever 27 so as to normally tend to return it to its rear position, as shown in Fig. 6. This spring also acts through the link 44, bell crank 43, link 31, arms 25 and 26 and link 41 to apply the brake when the lever 27 is released. In order that the belt tightener may be automatically released, at least to some extent, the projection 45 upon the slide 44 is provided, and this is so disposed that it lies in the upward path of the portion 47 of the right hand goose-neck 6. When the box body reaches its highest position this portion 47 engages the projection 45 forcibly lifting the slide 44, and thereby, through the interconnected elements, forcibly throwing the lever 27 toward its rear position either jerking it out of the hand of the operator so that the brake automatically goes on, by reason of the spring 46, or calling his attention to the fact that the body has reached its highest position. The same action also withdraws the tightener lever 25 so as to loosen the belt, and thus withdraw from the tilting apparatus the power of the motor and eliminate the danger of damage on that account.

The mechanism for releasing the tail-board is as follows: In order that the tail-board 49 of the body may be automatically released as the end of the body is tilted upwardly, I pivot the upper end of the tail-board to the sides of the body at 50 and pivotally connect two hooks 51 to the lower portion of its ends. These hooks have downwardly extending projections 52 near but not at their forward ends 53. On the box body I provide sockets 54 for receiving the projections 52 and when these projections are within the sockets the tail-board 49 is held in secured position as shown in Fig. 7.

Connected to the frame of the vehicle, are two rearwardly extending abutments 55 secured to the frame at 55', having ends 56 lying in the path of the ends 53 of the hooks. As the body is tilted the ends 53 tend to move downwardly but are prevented by the ends 56, as shown in Fig. 8, so that they are withdrawn from the sockets and free the tail-board so that it opens as shown in dotted lines in Fig. 1. In order that the tail-board may be hooked in closed position before the box body has fully been restored to normal position, I provide the ends of the abutments with cam surfaces 57 (Fig. 9) so that the ends 53 of the hooks can pass by the ends 56 when moving upwardly, the sockets 54 being sufficiently large to permit of the necessary play therein, and the backward extension of the abutment being long enough and sufficiently removed from the sides of the box body to permit of a spring action therein.

As will be evident to those skilled in the art, my invention permits of various modifications without departing from the spirit thereof or the scope of the appended claims.

What I claim is:

1. In an automatic automobile dump truck having a frame and a body tiltable thereon, the combination of a motor, a cable drum, a loose belt connection between said motor and drum, a manually controllable belt tightener for said belt, a cable extending from said drum to one end of said body for lifting the same, a brake adapted to hold said body in tilted position and a common means for manually actuating said belt tightener and applying said brake.

2. In a power-driven dump truck having a frame and a box body tiltable thereon, the combination of a motor, a cable drum, a loose belt connection between said motor and drum, a manually controllable belt tightener for said belt, a cable extending from said drum to one end of said box body for lifting the same, and means for automatically releasing said belt tightener when said box body has been lifted to a given point.

3. In a power-driven dump truck having a frame and a body tiltable thereon, the combination of a motor, a cable drum, a loose belt connection between said motor and drum, a manually controllable belt tightener for said belt, a cable extending from said drum to one end of said body for lifting the same, a brake, manual means for manually applying said tightener and said brake alternately, and a spring for releasing said belt tightener and for applying said brake to hold said body in tilted position when said manual means is released.

4. In an automatic dump truck having a frame and a body tiltable thereon, the combination of a motor, a cable drum, a loose belt connection between said motor and drum, a manually controllable belt tightener for said belt, a cable extending from said drum to one end of said body for lifting the same, a brake, manual means for manually applying said tightener and said brake alternately, a spring for releasing said belt tightener and for applying said brake when said manual means is released, and automatic means for releasing said belt tightener when said body has been lifted to a given point.

5. In an automatic dumper having a frame and a body tiltable thereon, the combination of a motor, two cable drums mounted in independent bearings and revoluble relatively to each other, a shaft parallel to the shaft of said motor and geared to said drums, a loose belt connection between said shafts, a manually controllable belt tightener for said belt, and cables extending from said drums to one end of said body for lifting the same, said body having goose-necks extending downwardly outside of said frame, and said frame carrying elevated pulleys supporting said cables between said goose-necks and said drums.

6. In an automobile dump truck having a truck frame, a body tiltable thereon, a clutch and a motor for driving said truck through said clutch, the combination therewith of a pinion shaft and drums having their shafts parallel to the axis of said motor and geared to said pinion shaft, a base supporting said shafts and carried by said truck frame, means for operatively connecting and disconnecting said pinion shaft and motor, cables connecting said drums and the forward end of said body, and a brake acting on said pinion shaft to hold said body in tilted position.

7. A self-contained lifting mechanism adapted to be applied to an automobile dump truck having a truck frame, a body tiltable on the truck frame, a clutch and a motor for driving said truck through said clutch and comprising a base adapted to be secured to the truck frame and supported thereby, two drums, and an actuating shaft geared to said drums, all mounted on said base and having their axes parallel to the axis of the truck uprights located at the ends of said frame, said shaft being adapted to be connected and disconnected with the motor of said truck, and said motor being adapted to be connected and disconnected with the front end of the tiltable body through cables passing from said drums over said uprights.

JOSEPH J. HERLBAUER.